United States Patent [19]
McGuire

[11] Patent Number: 4,722,117
[45] Date of Patent: Feb. 2, 1988

[54] SCALLOP CLEANING MACHINE

[76] Inventor: Dick McGuire, 127 Boque Sound Dr., Swansboro, N.C. 28584

[21] Appl. No.: 39,025

[22] Filed: Apr. 16, 1987

[51] Int. Cl.$^4$ .............................................. A22C 29/04
[52] U.S. Cl. .......................................... 17/53; 17/73; 17/48
[58] Field of Search .......................... 17/48, 53, 73, 74

[56] References Cited

U.S. PATENT DOCUMENTS

| | | | |
|---|---|---|---|
| 2,801,659 | 8/1957 | Carter | 17/73 X |
| 3,740,795 | 6/1973 | Cox | 17/73 |
| 3,802,029 | 4/1974 | Martin | 17/53 |

Primary Examiner—Willie G. Abercrombie
Attorney, Agent, or Firm—John B. Dickman, III

[57] ABSTRACT

An apparatus for cleaning shellfish such as scallops to separate the edible muscle tissue from the waste soft mass of viscera and organs. The apparatus has a plurality of reciprocating plates alternating with stationary working plates, where the forward action of the reciprocating plates moves the scallops from one stationary plate to the next. The surfaces of each of the plates, reciprocating and stationary, are covered with a gritty or abrasive material which the waste material clings to, separating itself from the edible muscle tissue. The cleaning occurs both during the forward and the reverse movement of the reciprocating plates.

8 Claims, 10 Drawing Figures

SCALLOP CLEANING MACHINE

BACKGROUND OF THE INVENTION

This invention is directed to cleaning shellfish, and in particular, the class of shellfish known as mollusks. Shellfish have a shell, the usual organs such as digestive system and circulatory system, and some means of travel. Clams, for example, have a single propelling foot, whereas scallops use an adductor muscle to open and close their shell halves for propulsion. Mollusks, such as claims and scallops are the subject of this invention. Both clams and scallops have a soft mass, called viscera, surrounding the organs and muscle tissue. It has been found the viscera which resembles a heavy viscous fluid is somewhat easier removed from clams than it is from scallops. Therefore, while the invention is for cleaning all types of shellfish, it is particularly suited for cleaning scallops.

At present, the known methods for cleaning shellfish is either by scrubbing with water or the user of a vacuum to remove unwanted matter. Since scrubbing is both time consuming and costly it is not practical to do on a commercial scale. Likewise, the cost of vacuum equipment and the needed conveyors may be too expensive. The following mollusk cleaning apparatuses use a vacuum cleaning system, and are therefore of general interest:

U.S. Pat. No. 3,460,192
U.S. Pat. No. 3,864,788

The prior art is devoid of references on cleaning fish and shellfish, in particular, employing methods or apparatuses similar to the present invention. The closest known references related to the cleaning action of the invention relates to shaking apparatus for sifting or sorting articles such as sand and gravel. There may also be references on polishing machines that may be of interest to the state-of-the art; however such references, including those on shaking apparatuses would only be of general interest and would not teach or suggest the invention.

SUMMARY OF THE INVENTION

The present invention relates to a shellfish cleaning method and apparatus, and in particular to mollusks, such as clams and scallops, and a method and apparatus for separating edible muscle tissue from viscera and other organs.

The adductor muscle of a scallop is a very tasty edible tissue found on most all menus of good seafood restaurants. Therefore, it represents a big business. Unless there are faster and less costly ways of cleaning the edible tissue, the cost may become too prohibitive for many restaurants. The problem is identified as getting rid of the viscera and unwanted organs as quickly and inexpensively as possible.

The invention includes a method of removing the unwanted matter by moving the meaty tissue over a constantly shifting surface that has been covered with a gritty material. The unwanted viscera and organ matter is pulled away from the meaty tissue because it clings to the gritty material as the meaty tissue is constantly moved forward, thereby unwrapping the meaty tissue in the process. Since the viscera is a soft mass, fluid-like in appearance, it tends to flow into the gritty material adhering itself against the forward movement of the meaty tissue. The method obviously depends on the meaty tissue being in contact with the gritty surface long enough to remove the unwanted viscera and organs. To this end the shellfish cleaning apparatus has a unique working surface and working action to prolong contact between the edible meaty tissue and the gritty surface.

The shellfish cleaning apparatus is specifically designed to remove the soft mass of viscera and organs from scallops. It is of course possible to clean other shellfish such as clams and oysters by a slight change in the apparatus.

Since the edible scallop adductor muscles are covered with a viscera and the fluid-like mass also covers other organs, it is necessary to strip away the viscera to produce a product that has a salable appearance and taste good. To strip away the viscera material, the cleaning apparatus has reciprocating plates which move back and forth between stationary plates. The stationary plates are parallel to each other and are at an incline similar to stair steps. Reciprocating plates move in unison back and forth with one plate between each pair of stationary plates. Each reciprocating plate contacts an upper and lower stationary plate alternately to progressively move and turn the edible muscle. Both the reciprocating plates and the stationary plates are wrapped with a tape having a gritty surface for stripping the viscera material from the edible muscle tissue.

The constant reciprocation of the moving plates between the stationary plates creates several different actions on the scallop muscle. First, the covered muscle is pushed forward over a stationary plate where the viscera material clings to the gritty surface. Secondly, the muscle drops onto the next moving plate and the plates reciprocate backward causing the muscle to turn over and over as the viscera material trapped on the gritty surface of the stationary plate is stripped from the muscle. Thirdly, upon full retraction of the moving plates the viscera material, which has transferred partially to the bottom surface of the moving plate, pulls free and drops into a collection bin. The scallop muscle tissue continues its forward movement from each moving plate until the muscle is cleaned of all viscera material and finally collects in a separate storage compartment.

The apparatus has an elevating mechanism to change the angle of incline to either speed up or slow down the stripping process. An electric motor drives the reciprocating plates and powers the elevating mechanism.

It is a primary object of the invention to provide a method and apparatus for removing viscera material from mollusks.

A further object is to provide an apparatus with a reciprocating action that strips viscera material from edible muscle.

Still another object is to provide an apparatus that cleans the edible meat without wasting any of the muscle tissue.

Another object is to provide an apparatus that is easy to maintain and inexpensive to construct.

These and other objects will become apparent from the following drawings and description.

DESCRIPTION OF THE DRAWINGS

FIG. 4b is a side plan view showing a reciprocating motion of FIG. 4a.

DESCRIPTION OF THE INVENTION

Figure 1:
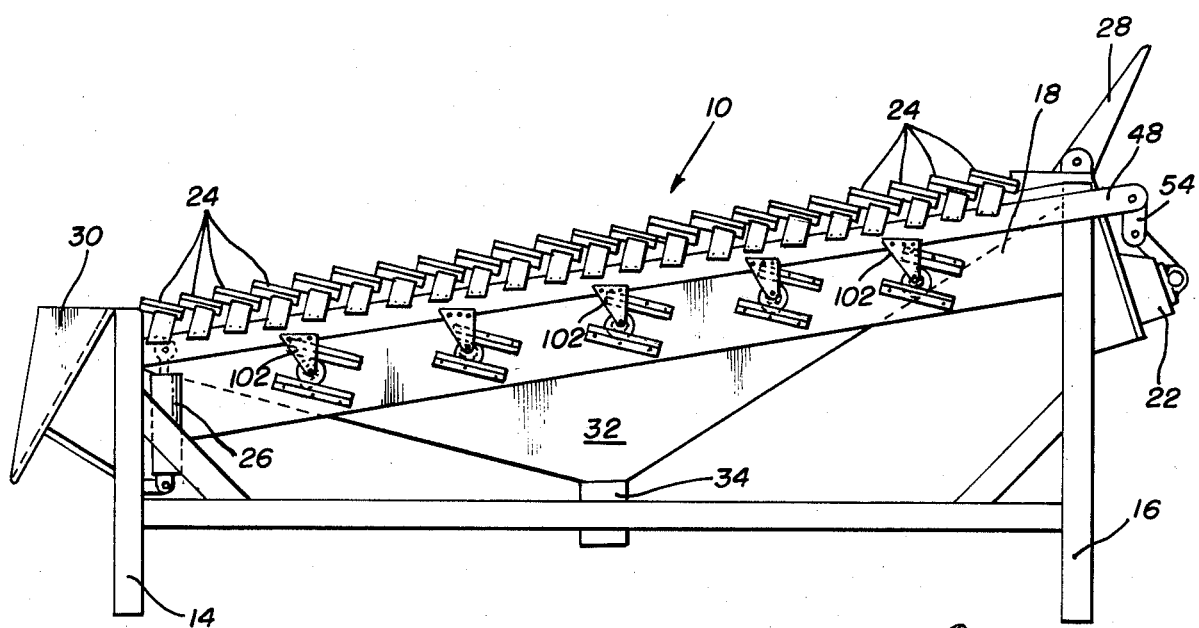
FIG. 1 is a side plan view of a shellfish cleaning apparatus of the invention.

Referring to the drawings, there is shown in FIG. 1 a shellfish cleaning apparatus 10 of the invention. The apparatus 10 has a stand 12 which includes a pair of front legs 14 and a pair of rear legs 16, with the front legs 14 being shorter than the rear legs 16. Mounted on the stand 12 is shellfish cleaning table 18, which has a series of reciprocating plates 20 operated by a power supply 22, and a series of stationary plates 24. A hydraulic ram 26 mounted between the front legs 14 of the stand 12 raises and lowers the front end of the shellfish cleaning table 18 to a desired working angle, according to the speed of travel of the shellfish, particularly scallops, and the number of shellfish.

At the upper end of the cleaning table 18 is a feeding tray 28, and at the lower end is an edible tissue dispensing tray 30. Beneath the cleaning table 18 is a waste material collecting bin 32 with a funnel spout 34 for emptying into a disposal.

Figure 2:
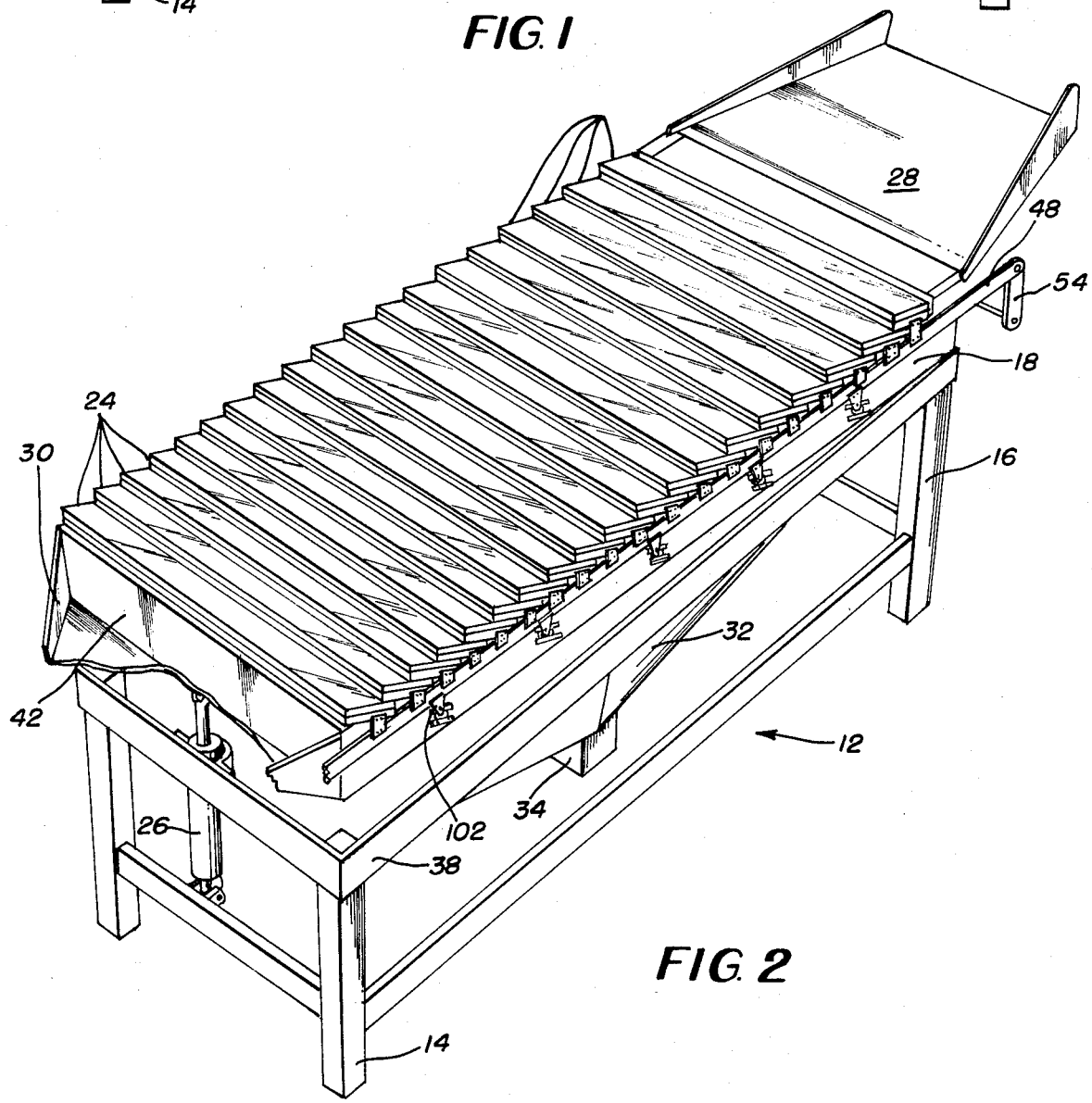
FIG. 2 is an isometric view of the shellfish cleaning apparatus of FIG. 1.

Looking at FIG. 2, the shellfish cleaning table 18 is more clearly shown. The table has a base frame 36, that is made of metal, such as aluminum, with two side members 38 having saw tooth or stair step cut-outs 40 and a pair of end support members 42. The base frame 36 is hinged to the stand 12 at the upper end by pivot pins 44, so that the hydraulic ram 26, mounted to cross member 46 of the stand, can raise or lower the table 18. A pair of rack rods 48 reciprocate along the sides of members to move reciprocating plates 20 forward and backward, the operation of rack rods 48 is better shown in FIG. 3. Reciprocating plates 20 as shown in FIG. 2 in a retracted position are hidden partially by stationary plates 24.

Figure 3:
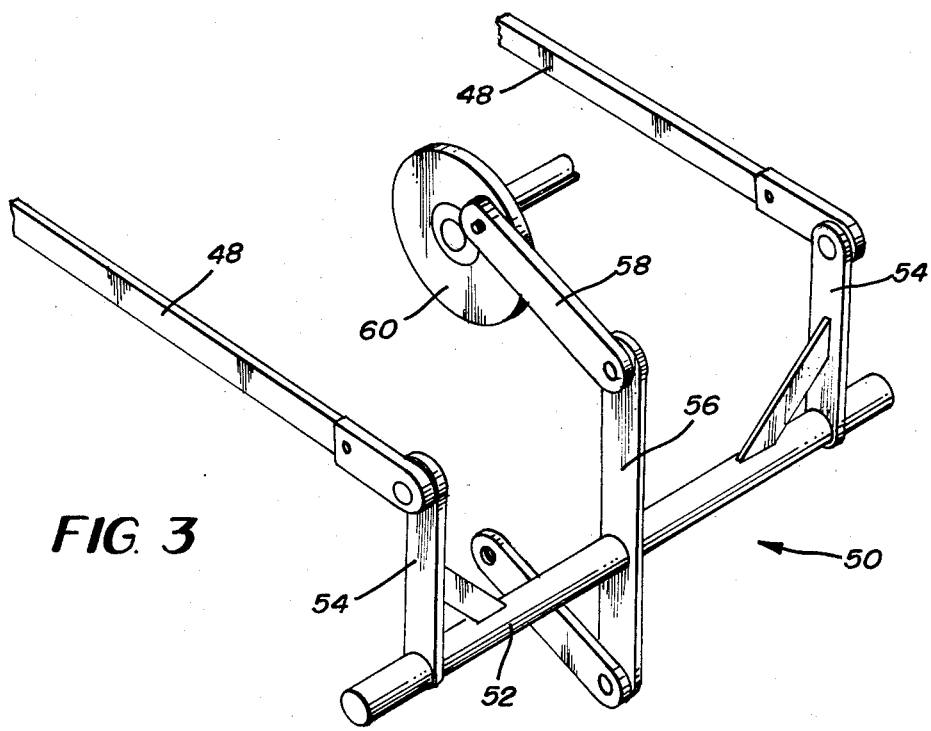
FIG. 3 is an isometric view of a drive system for the shellfish cleaning apparatus of FIG. 1.

A schematic of a power output assembly 50 for reciprocating the rack rods 48 and reciprocating plates 20 is shown in FIG. 3. Rack rods 48 are pivotally connected to rotating shaft 52 by arms 54. The rotating shaft 52 is supported in a horizontal plane such that it will rotate about its axis. Power transfer arm 56 is affixed midway of the rotating shaft 52 to impart a back and forth rotation to the shaft 52. One end of the power transfer arm 56 is pivotally connected to an oscillating arm 58, pivoted to a rotating power wheel 60. The other end of power transfer arm 56 may be used as an alternate pivot connection for connecting to a power wheel that is mounted below shaft 52 instead of above it as shown. A drive shaft 62 is connected to power wheel 60 at one end and to an electric motor at the other end. The connection to the electric motor may be direct or through a pair of pullups and a pulley belt.

Figure 4:
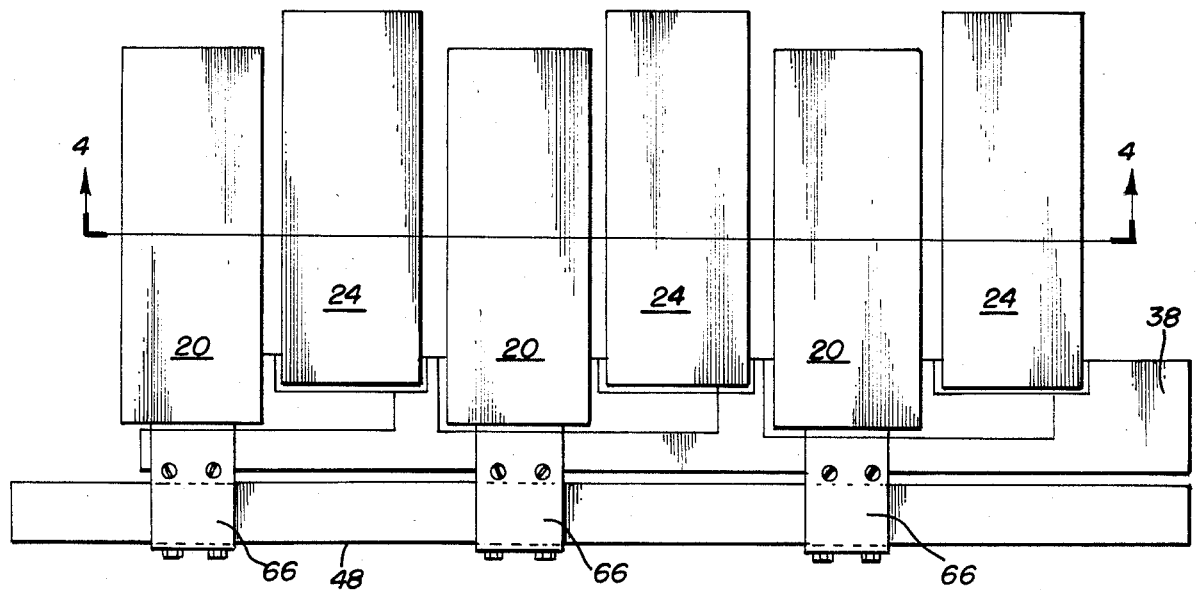
FIG. 4 is a top plan view of the cleaning plates of the present invention.

FIG. 4 shows the shellfish cleaning table 18 and the reciprocating plates 20 and stationary plates 24. It should be noted that reciprocating plates 20 are offset from stationary plates 24 to allow plates 20 to pass between plates without binding. Stationary plates 24 are fixed to side members 38 to base frame 36 by a special bracket 64, FIG. 5, to allow the reciprocating plates 20 to pass between the stationary plates 24. The stair step cut-outs 40 of FIG. 2 serve as slides for the reciprocating plates 20. Brackets 64 support the stationary plates 24 above the step to allow the plates 20 to move under plates 24. Reciprocating plates 20 are connected to rack rod 48 by a bracket assembly 66, best shown in FIGS. 5 and 9. A connecting bar 68 is welded to the end of plate 20 and connected to L-bracket 70 by bolts 72. Free end 74 of L-bracket 70 is fastened to rack rod 48 by screws.

Figure 4A:
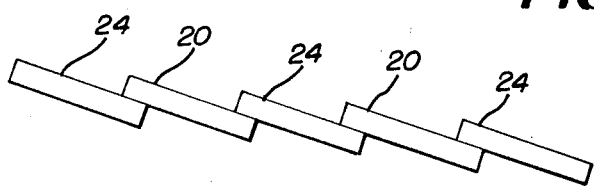
FIG. 4a is a side plan view taken along the line 4—4 of FIG. 4.
Figure 4B:
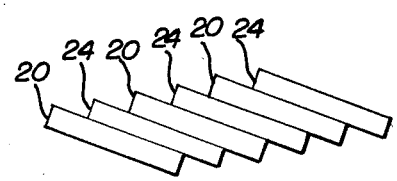

Again, turning to FIG. 5 the rack rod 48 has wedge blocks 76 secured to the bottom side for sliding on a wedge block base 78, with identical cut-outs or stair steps 80 to cut-outs 40 of side members 38. The step faces 82 are metal with a teflon coating for friction free siding. When forward power is applied by the power output assembly 50 to the reciprocating rack rods 48, the wedges 76 slide over the step faces 82 and the plates 20 move forward as in FIG. 4a. As the power output assembly continues its movements the rack rods 48 reciprocate in the opposite direction, retracting the plates 20 as in FIG. 4b.

Figure 5:
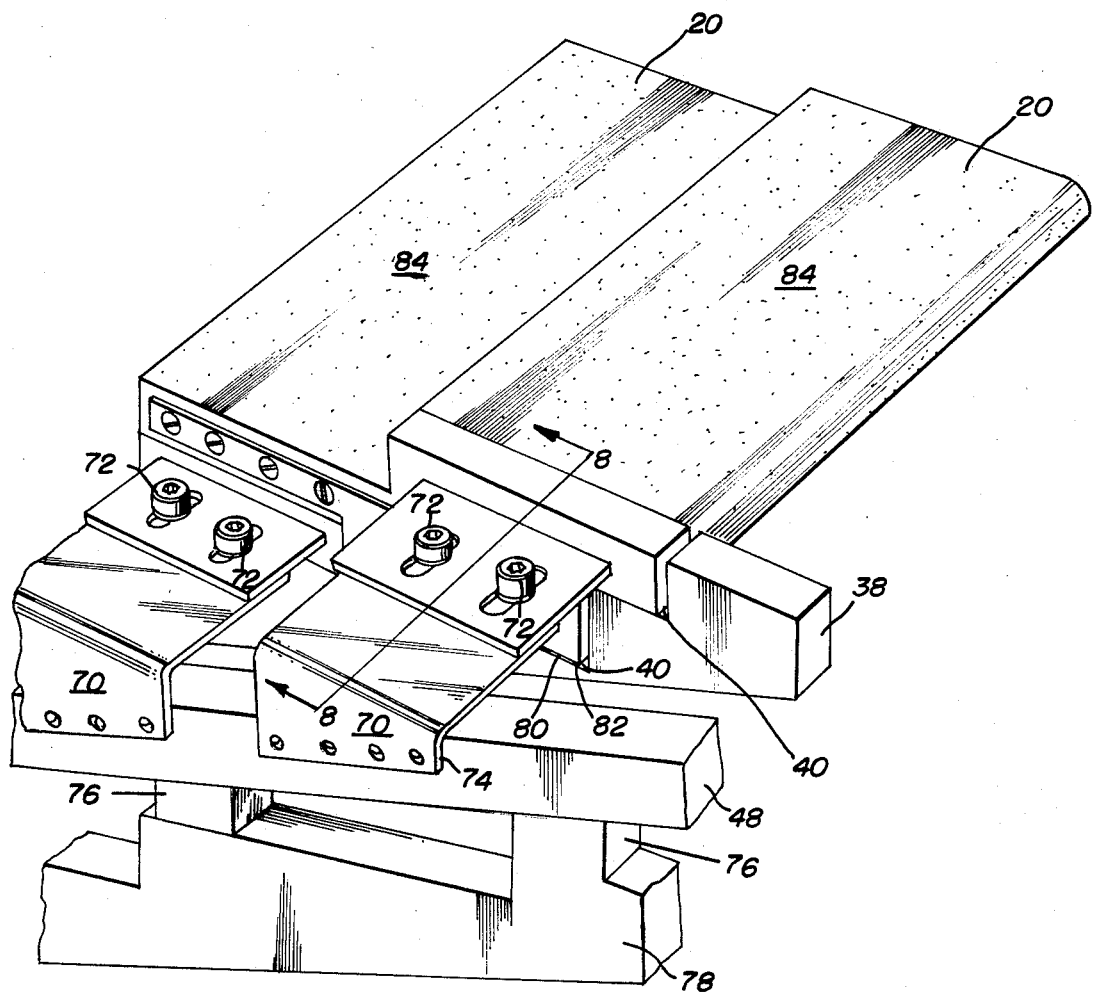
FIG. 5 is an isometric view of reciprocating plates and stationary plates of the present invention.
Figure 8:
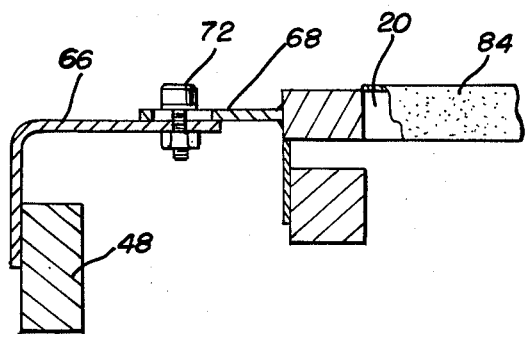
FIG. 8 is an end view of a reciprocating plate taken along the line 8—8 of FIG. 5.

The reciprocating plates 20 and stationary plates 24 are covered with a gritty material 84. In FIGS. 5 and 8, an industrial tape manufactured by 3M, which is used for non skid-purposes, has been found very satisfactory. The non-skid tape has a long work life and has been found very easy to remove and rewrap around the plates. As can be seen, the tape 84 is completely wrapped each plate, making sure to cover both top and bottom. It is contemplated that a spray on adhesive and gritty material may also be used.

In order to keep the reciprocating plates 20 aligned with the stationary plates 24 and to avoid any mechanical failure, there is welded to the ends of each plate a downwardly projecting slide 86. When the reciprocating plate 20 moves forward and backward the slide 86 moves with it over the outer surface of side members 54. Since each plate 20 has two such slides 86, one at each end, the plates are prevented from moving from side to side to misalignment.

Figure 6:
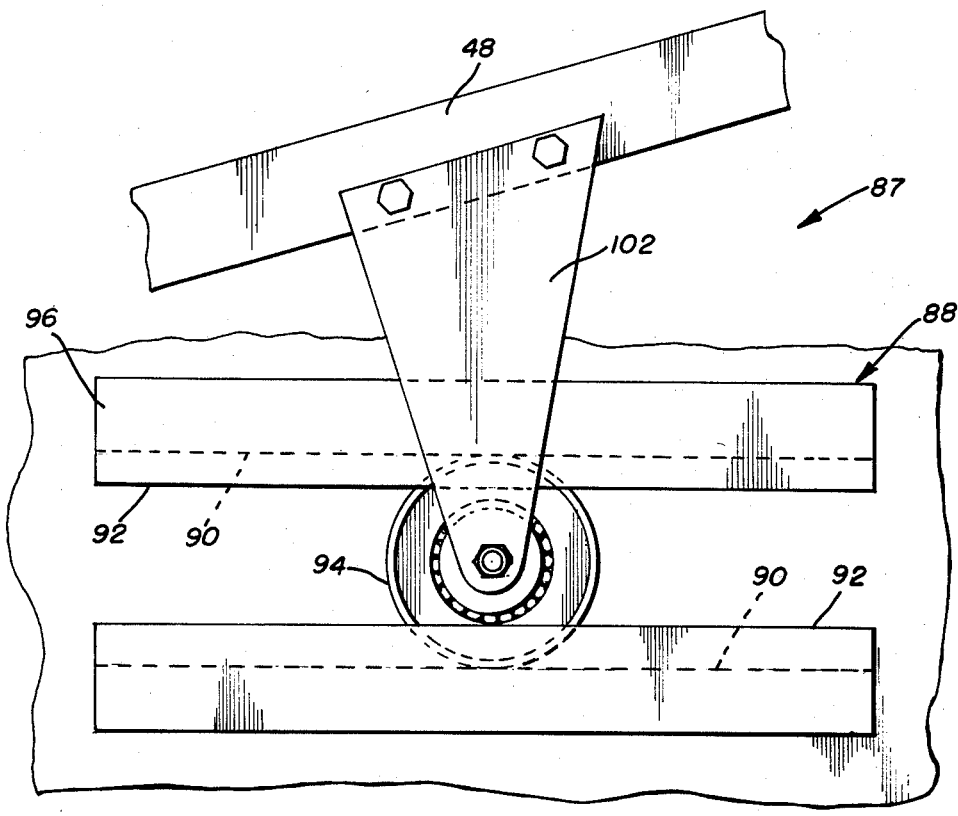
FIG. 6 is a side elevation view of an embodiment of the reciprocating plates and stationary plates shown in FIG. 5.
Figure 7:
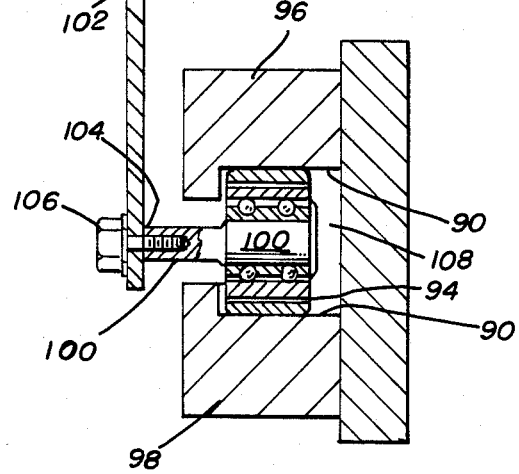
FIG. 7 is a side elevation view of another embodiment of the wedge mechanism shown in FIG. 5.

In place of the wedges 76 and wedge block base 78, a track and roller system 87 of FIGS. 6 and 7 may be used. The track 88 has a roller engaging surface 90 and guide rail 92 to prevent a roller 94 from jumping off the track. The length of each track is equal to the total forward and backward travel of a plate 20, and the tracks, which include an upper and lower track 96 and 98, are in a parallel plane to the reciprocation of plates 20. the rollers 94 have an axle 100 fixed to bracket 102 that in turn is fastened to the rack rod 48. The rollers 94 may have ball bearing races as shown in FIG. 6, or they may have an anti-friction bearing such as teflon.

FIG. 7 clearly shows in cross section the roller 94, an axle 100 and the bracket 102. The axle 100 mounts on the bracket 102 through a hole 104 in the bracket, and is secured by a washer and bolt 106. A ball bearing race 108 is shown supporting axle 100 and roller 94.

OPERATION OF THE DEVICE

The operation of the shellfish cleaning apparatus begins with removing the shell and collecting the muscle tissue, viscera, etc. The collecting material is deposted on the clean table 18 while the reciprocating plate are moving. Care is taken to make sure the scallops are just one layer deep. If there is a large volume of scallops to be cleaned and time is allowed for slow cleaning the lower end of the table 18 is elevated by a hydraulic ram to slightly impede the scallops forward movement. In otherwords, the higher the lower end is raised, the more likelihood the scallops will tumble back onto a preceeding plate 20 or 24. This may be desirable to ensure more complete cleaning.

Once on the cleaning table a scallop is pushed forward by the first reciprocating plate 20 to where it falls onto the next stationary plate 24. This process continues until the scallop meat reaches the end where it slides down dispenser 30 into a collection vessel. As the scallop is moved along, the viscera and unwanted organs are separated from the meaty tissue by the gritty surfaces of plates 20 and 24. As explained, the viscera material which is a soft mass tends to cling to the gritty surface; therefore, when the reciprocating plates 20 push the meaty tissue along the soft mass unwraps itself and is left behind, leaving a trail on the plates. The plates may be of different sizes.

The soft mass of viscera and organs are removed from the plates by the reciprocating action which separated the meaty tissue from the viscera. The soft mass which collects on the top surface of a stationary plate 24 is picked up and carried backward by a retracting reciprocating plate 20. When plate 20 is completely retracted, the weight of the soft mass and gravity frees it from the gritty surface. The soft mass of viscera drops into a waste collection bin for disposal. The cleaning takes place both in the forward and reverse movements of the plates.

A wide variety of materials may be used for constructing the shellfish cleaning apparatus, in particular metals like heavy gage aluminum work very well. Other metals such as steel are fine, however, steel does add to the overall weight without too much difference in results. Stainless steel is a good material. Where necessary, the moving parts should be coated with an antifriction material such as teflon.

While a hydraulic ram is shown any power operated ram will be more than adequate.

Even though just one embodiment of the shellfish cleaning apparatus has been shown, and a second embodiment using a track and roller assembly in place of the wedge assembly has been shown, it should be understood that one skilled in the art may realize other embodiments of the invention, therefore for a complete understanding of the invention one should consider the invention by studying the drawings and description in view of the claims.

I claim:

1. An apparatus for cleaning shellfish meat which has been separated from its shell by further separating the edible muscle tissue from the soft mass of viscera and organs comprising:

a shellfish cleaning table supported on a free standing stand, said cleaning table being hinged at one end and raised and lowered at the other end, a means to raise and lower one end of said cleaning table to prolong or speed up the cleaning of shellfish edible muscle tissue, a plurality of stationary working plate means fixed to said cleaning table, said plates being arranged parallel to one another and in a spaced relationship to form a stair step-like arrangement, a plurality of reciprocating working plate means interposed between said stationary working plate means, said reciprocating plate means being parallel to one another and connected together in a spaced relationship to form a stair step-like arrangement that moves to cover and uncover said stationary working plate means, a gritty surface means for covering each of said stationary working plate means and said reciprocating working plate means for removing the soft mass of viscera and organs from the edible muscle tissue, and means to reciprocate said reciprocating working plate means to push the edible muscle tissue from one stationary working plate means to the next, removing the soft mass of viscera and organs by collecting on the gritty surface of the working plates.

2. An apparatus as in claim 1 wherein said cleaning table supported on a free standing stand is lower at the discharge end and can be raised to a horizontal height by a ram means mounted at the lower end of said table.

3. An apparatus as in claim 2 wherein said stationary working plate means are off set from said reciprocating working plate means to allow free reciprocation of said plates.

4. An apparatus as in claim 3 wherein said stationary working plate means are attached by a bracket means to a base frame and said reciprocating working plate means are attached by a bracket means to a reciprocating rack rod means to move said reciprocating plate means between said stationary working plate means.

5. An apparatus as in claim 4 wherein said rack rod means is pivotally connected to an oscillating assembly to move said rack rod means forward and backward.

6. An apparatus as in claim 5 wherein said working plate means are wrapped with a non-skid abrasive tape for removing soft mass viscera and organs from edible muscle tissue.

7. An apparatus as in claim 6 wherein said rack rod means has wedge means which slide on a wedge slide means to eliminate misalignment of said rack rod means and said reciprocating working plate means.

8. An apparatus as in claim 6 wherein said rack rod means has a track and roller means to eliminate misalignment of said rack rod means and said reciprocating working plate means.

* * * * *